(12) United States Patent
Iyer et al.

(10) Patent No.: US 9,756,173 B2
(45) Date of Patent: Sep. 5, 2017

(54) LEVERAGING MOBILE DEVICES TO ENFORCE RESTRICTED AREA SECURITY

(71) Applicant: International Business Machines Corporation, Armonk, NY (US)

(72) Inventors: Sreekanth Ramakrishna Iyer, Bangalore (IN); Jeffrey Robert Hoy, Southern Pines, NC (US); Kaushal Kiran Kapadia, Pune (IN); Ravi Krishnan Muthukrishnan, Bangalore (IN); Nataraj Nagaratnam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/672,104

(22) Filed: Mar. 28, 2015

(65) Prior Publication Data
US 2016/0286034 A1 Sep. 29, 2016

(51) Int. Cl.
| H04M 3/00 | (2006.01) |
| H04M 3/42 | (2006.01) |
| H04M 11/00 | (2006.01) |
| H04M 1/725 | (2006.01) |
| H04W 12/08 | (2009.01) |

(Continued)

(52) U.S. Cl.
CPC ....... *H04M 1/72577* (2013.01); *H04W 4/021* (2013.01); *H04W 12/08* (2013.01); *H04M 1/72572* (2013.01); *H04W 12/06* (2013.01); *H04W 88/02* (2013.01)

(58) Field of Classification Search
None
See application file for complete search history.

(56) References Cited

U.S. PATENT DOCUMENTS

2003/0069829 A1\* 4/2003 Gathman ............... G06Q 30/08
705/37
2007/0155374 A1\* 7/2007 Yang ..................... H04L 63/102
455/421

(Continued)

OTHER PUBLICATIONS

"Endpoint Manager for Mobile Devices User's Guide," IBM, Jun. 2012.

(Continued)

*Primary Examiner* — Moustapha Diaby
(74) *Attorney, Agent, or Firm* — Jeffrey S. LaBaw; David H. Judson (57) ABSTRACT

A technique to enforce a physical security constraint leverages a user's mobile device while at the same time enabling the user to continue use of the device for appropriate purposes within a restricted area. A user's access to a restricted area with his or her mobile device in effect is "conditioned" upon installation (on the device) of an endpoint agent that controls features of the mobile device based on one or more factors, such as the user's role, a current location of the user within the restricted area, and other criteria as defined in a security policy. Preferably, the agent is instantiated automatically when the user enters the restricted area, with the device then restored to its prior state when the user leaves the restricted area. The particular features of the mobile device that are controlled may be varied, even within particular zones of the restricted area itself.

21 Claims, 5 Drawing Sheets

(51) Int. Cl.
*H04W 4/02* (2009.01)
*H04W 12/06* (2009.01)
*H04W 88/02* (2009.01)

(56) References Cited

U.S. PATENT DOCUMENTS

| | | | |
|---|---|---|---|
| 2011/0252464 A1 | 10/2011 | Sanjeev | |
| 2011/0291798 A1* | 12/2011 | Schibuk | G07B 15/00 |
| | | | 340/5.61 |
| 2012/0324542 A1* | 12/2012 | McLaughlin | G06Q 30/00 |
| | | | 726/4 |
| 2013/0013932 A1 | 1/2013 | Kong et al. | |
| 2014/0013406 A1 | 1/2014 | Tremlet | |
| 2014/0082754 A1* | 3/2014 | Guo | G06F 21/00 |
| | | | 726/30 |
| 2015/0050922 A1* | 2/2015 | Ramalingam | H04W 12/08 |
| | | | 455/418 |
| 2016/0014660 A1* | 1/2016 | Bar | H04W 4/008 |
| | | | 455/439 |

OTHER PUBLICATIONS

Buecker et al, "Understanding IT Perimeter Security," IBM Redpaper, 2008.

Madan et al, "Securely Adopting Mobile Technology Innovations for Your Enterprise Using IBM Security Solutions," IBM Redguides for Business Leaders, 2013.

\* cited by examiner

LEVERAGING MOBILE DEVICES TO ENFORCE RESTRICTED AREA SECURITY

BACKGROUND OF THE INVENTION

Technical Field

This disclosure relates generally to information security and, in particular, to a policy-based approach to enable mobile devices to enforce restricted area security.

Background of the Related Art

The recent past has seen an enormous growth in the usage and capabilities of mobile devices, such as smartphones, tablets, and the like. Such devices comprise fast processors, large amounts of memory, gesture-based multi-touch screens, and integrated multi-media and GPS hardware chips. Many such devices use open mobile operating systems, such as Android. The ubiquity, performance and low cost of mobile devices have opened the door for creation of a large variety of mobile applications.

Enterprises are now providing their workforce with mobile devices to enable them to work from anywhere. In addition, enterprise employees also are using their personal mobile devices to connect to enterprise networks to enable them to work from remote locations. Organizations are even allowing employees to use their own mobile devices to run enterprise applications. Under these various scenarios, enterprises need to consider the implications of mobile devices on enterprise security. Security risks presented by such scenarios include the impact to the enterprise of lost or stolen devices, the management of confidential information, and the capability for unauthorized access to the corporate network. The management of security risks in this type of environment is a complex problem.

The above-identified problem is exacerbated for mobile device usage within physical areas accessible by a user but that have other security restrictions associated therewith. Physically-restricted areas are of many types, from business offices, to government installations, and the like. Physically-restricted areas often do not allow mobile devices because such devices pose data loss threats. For example, when agents visit a business process outsourcing office, often they are not even allowed to carry their mobile devices into the work area to prevent any leakage of customer information. At other sensitive installations (e.g., laboratories, military bases, airport custom areas, and the like), employees and visitors alike may need to be prevented from certain actions, such as taking pictures and then sharing them with others, e.g., through social channels accessible via WiFi or other mobile device data collection techniques.

Current methods of restricting mobile devices in restricted areas generally are low-tech and highly-intrusive, for example, typically the agent is required to deposit his or her phone in a locker at an entry gate, and then collect it back when leaving the restricted area. As mobile devices become increasingly powerful, however, this loss of the physical control over the device has growing productivity impact to the employee. Ideally, it would be desirable to allow the user to retain possession of his or her device within the restricted access zone but, at the same time, to allow or deny specific features of the device while within that zone. For instance, from a security standpoint, it may be acceptable to allow the user to receive incoming telephone calls on the phone while at the same time inhibiting the device from accessing WiFi or other mobile data access technologies that might otherwise provide a means for external transfer of sensitive data. What particular device features need to be allowed or blocked, and under what circumstances, is highly variable and depends on many factors, such as the user's identity, visit context, and the like.

While restricted areas typically include access control mechanisms, these mechanisms do not leverage mobile device capabilities and associated security technologies. In particular, these prior approaches do not provide for the capability to automate enforcing security policy on a mobile device, particularly in the context of entry and exit into a physical area having an associated restriction.

BRIEF SUMMARY

According to this disclosure, a technique to enforce a physical security constraint leverages a user's mobile device while at the same time enabling the user to continue use of the device for appropriate purposes within a restricted area. According to this disclosure, a user's access to a restricted area with his or her mobile device in effect is "conditioned" upon installation (on the device) of an endpoint "agent" (e.g., a software component) that controls features of the mobile device based on one or more factors, such as the user's role, a current location of the user within the restricted area, and one or more other criteria as defined in a security policy. Preferably, the agent (and thus the policy) is instantiated automatically when the user enters the restricted area (assuming he or she is permitted to do so with the mobile device in hand), with the device then restored to its prior state when the user leaves the restricted area. The particular features of the mobile device that are controlled may be varied, even within particular zones of the restricted area itself. If the user attempts to an action that is not permitted by the policy (or that attempts to override the policy itself), the agent controls the mobile device to prevent such an action, or to raise alarm, or the like. The device agent also may continually authenticate itself to a management system while the user is present within the restricted area to identify the user movements or position.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
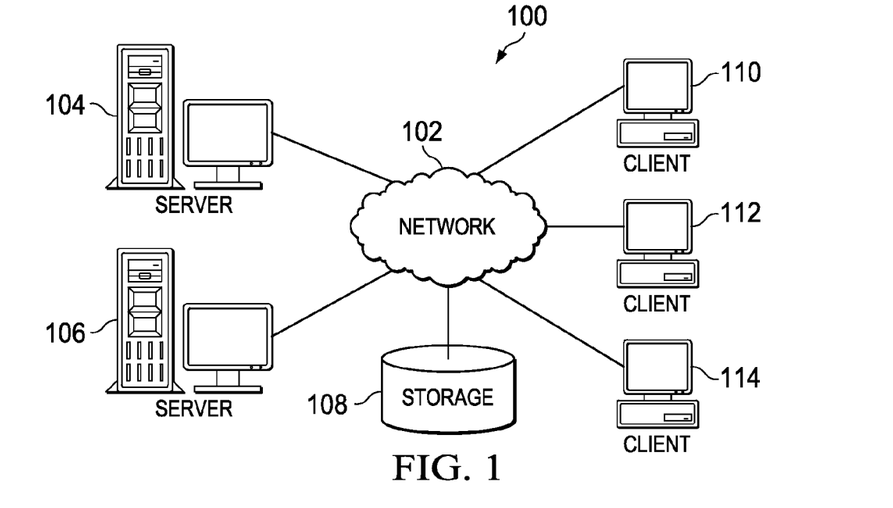
FIG. 1 depicts an exemplary block diagram of a distributed data processing environment in which exemplary aspects of the illustrative embodiments may be implemented.
Figure 2:
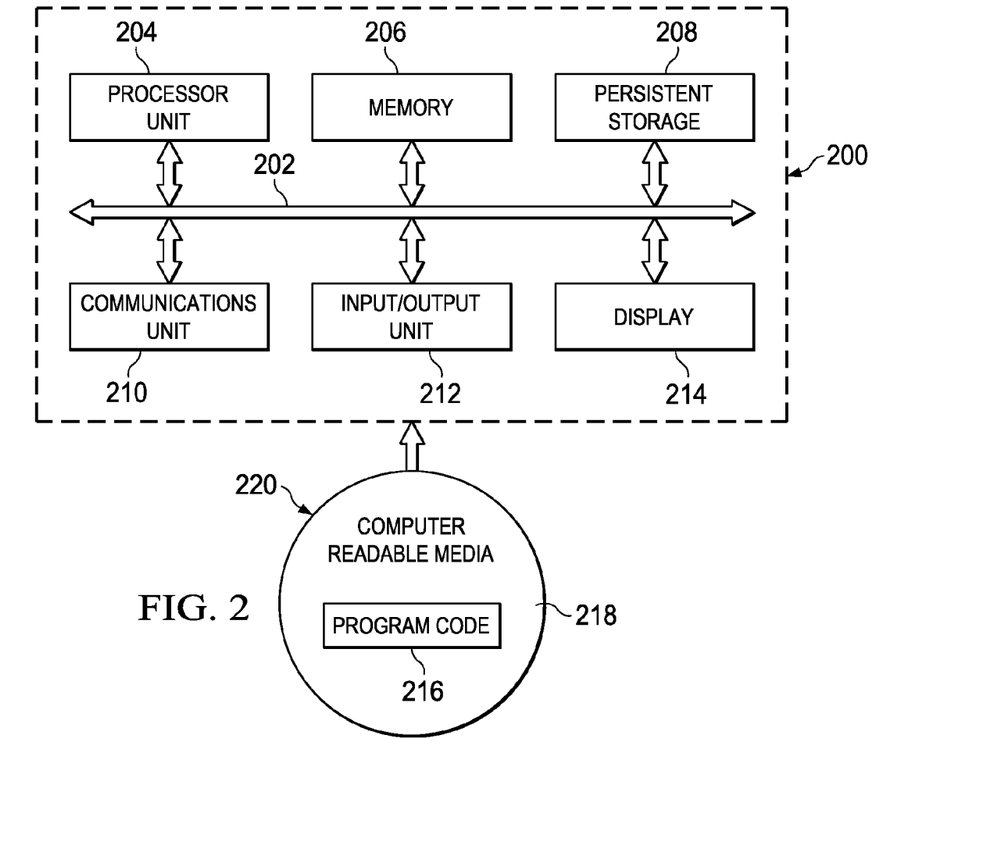
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Mobile Device Technologies

Figure 3:
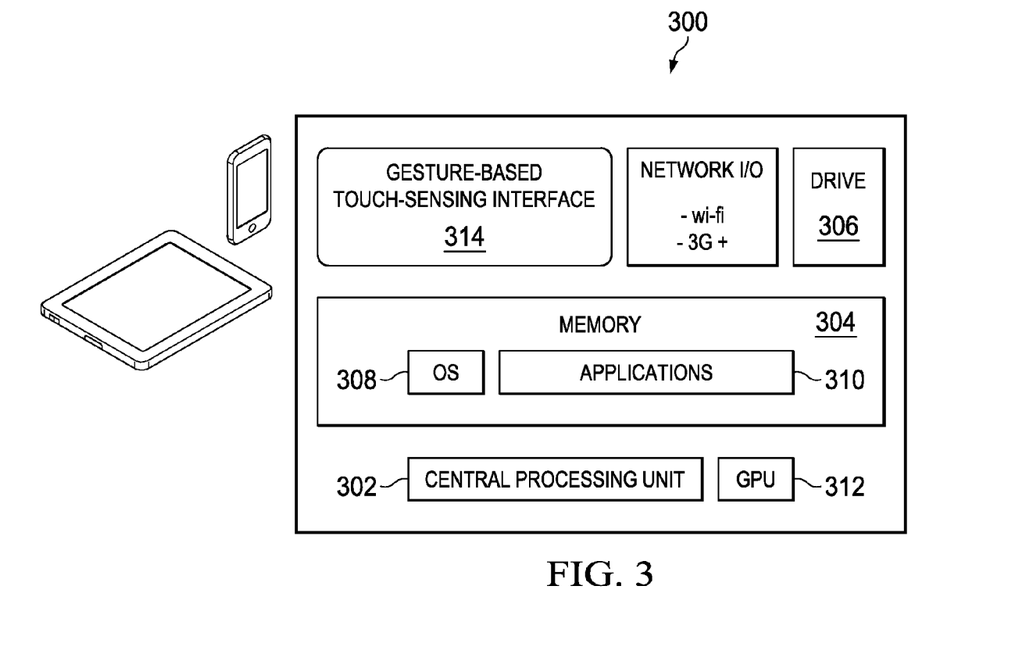
FIG. 3 illustrates a representative mobile device in which the disclosed subject matter may be implemented.

Mobile device technologies also are well-known. A mobile device is a smartphone or tablet, such as the iPhone® or iPad®, an Android™-based mobile device, or the like. As seen in FIG. 3, a device 300 of this type typically comprises a CPU 302, computer memory 304, such as RAM, and a data store 306. The device software includes operating system (e.g., Apple iOS, Android, Blackberry OS, Windows Phone, or the like) 308, and generic support applications and utilities 310. Typically, the device includes a separate graphics processing unit (GPU) 312. A touch-sensing device or interface 314, such as a touch screen, is configured to receive input from a user's touch and to send this information to processor 312. The interface 314 responds to gestures on the touch sensitive surface. Other input/output devices include software-based keyboards, cameras, microphones, and the like.

More generally, the mobile device is any wireless client device, e.g., a cellphone, pager, a personal digital assistant (PDA, e.g., with GPRS NIC), a mobile computer with a smartphone client, or the like. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Thus, a mobile device as used herein is a 3G-(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Mobile Device Management Platforms

To manage devices and enforce corporate security policy, organizations use mobile device management (MDM) platforms. The MDM platform can also perform policy compliance assessments, device wipes, application management, and device lockdowns. Organizations that want to manage mobile devices typically require their employees to install an agent or a mobile application embedded with a management agent. Each user then has to register and activate the device before it can be used for business. Given the management resources required, self-management capabilities can be offered to the employees to improve the responsiveness of the solution. MDM solutions help organizations manage multivendor mobile devices through a central console, and help to enforce good practices, such as: password for user authentication, automatic locking if the device is idle for a certain period of time, anti-virus software and signature updates, auto wipe or erasing of data after a certain number of failed password attempts, self-service to remotely lock, locate, or wipe sensitive enterprise data on a device if stolen or lost, securing sensitive enterprise data by using, for example, encryption, containerization, or virtualization, configuration restrictions and patch level check, checks on jail-breaking or rooting the device, application blacklisting or white listing with the capability to un-enroll devices in the event a vulnerability is detected, and monitoring, alerting, and tracking policy violations and access to certain applications. A mobile device management platform also provides tools for remote administration of several functions, such as device enrollment, provisioning of users, asset management, patch management, software distribution, software upgrades, and audit and compliance reporting. A representative MDM platform of this type is IBM® Endpoint Manager for Mobile Devices, also known as IBM MaaS360.

Figure 4:
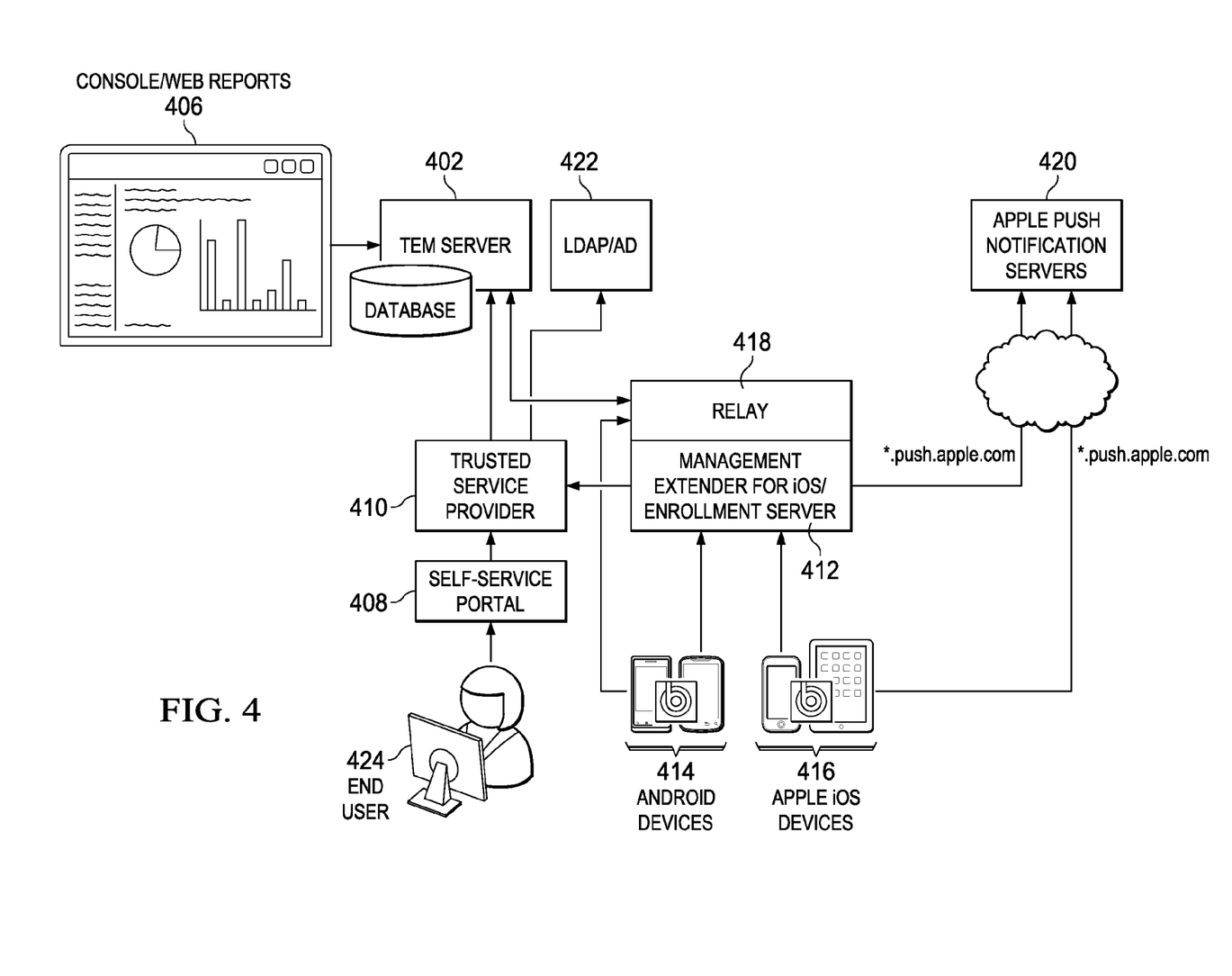
FIG. 4 illustrates a mobile device management system for use in association with the techniques of this disclosure.

FIG. 4 illustrates a representative mobile device management system that is known in the art. The system may be implemented across one or more machines, such as shown in FIG. 2, operating in a computing environment, such as shown in FIG. 1. One or more components may be located on-premises, or supported in a cloud environment. The mobile device management system comprises an endpoint management server 402 having an associated database 404. In one embodiment, the endpoint management server is implemented by the IBM Tivoli® Endpoint Manager platform, which provides support for basic management of mobile devices using e-mail-based management, for advanced management of devices using agent-based management, additional support functions such as mobile device inventory, security and password policy management, the ability to implement management commands such as wipe, lock, clear-password, deny e-mail access, push, and data roaming, other application management functions, and the like. The endpoint management system provides a web-based console 406 for display of web report and other information, and for interacting with the management platform. The management system preferably includes or is associated with a self-service portal 408 that, through a trusted service provider 410, enables management of a device without direct interaction with the management server. An enrollment server 412 enables users to register for the management service(s). In a representative embodiment, user mobile devices include both Android OS-based devices 414, and Apple iOS-based mobile devices 416. The enrollment server may support a management extender as necessary to support Microsoft® Windows-based applications. A Tivoli Endpoint Manager relay 418 also is installed in association with the enrollment server, which interoperates with various third party services, such as Apple® Push notification servers 420 (for iOS-based devices). A directory service 422 (e.g., LDAP-based, Active Directory-based, etc.) may be used to store registration details for the users and their mobile devices that are registered to use the system. Preferably, authenticated enrollment is enforced for users. Enterprise users 424 perform registration and management activities on the management platform, or such activities may be implemented programmatically through application programming interfaces (APIs) or the like.

An enterprise may use the mobile device management platform to automate registration activities, define and instantiate security policy, and otherwise manage how mobile device users will be permitted to access and use their mobile devices within a restricted security area.

The console 406 may be used as a policy administration point (PAP) to define a security policy. Alternatively, a distinct policy management system (PMS) may be used to define security policy. One such policy management system may include a policy administration point (PAP) that enables an authorized enterprise user to define one or more security policies, e.g., as a set of XACML policy expressions. A particular security policy may then use subject attributes provided from the database 404 or the directory repository 422, as well runtime and environment data received from one or more policy information points. A commercial implementation of this approach is the IBM® Tivoli® Security Policy Manager (TSPM) policy service/console, with run-time security service support using a TSPM plug-in to an application server, such as IBM WebSphere® Application Server.

Of course, the mobile device management platform may be implemented with other devices and products other than the particular commercial products and systems shown and described above.

Leveraging Mobile Device to Enforce Restricted Area Security

With the above as background, the subject matter of this disclosure is now described.

According to this disclosure, it is assumed that end users operate mobile devices that are adapted to be carried by the end users into a restricted area. The restricted area may be of any type, and it may have any physical characteristics and parameters. The area may be restricted at a certain time and not others. It may be physically sub-divided into zones, each of which having different security requirements. Typically, the restricted area (or a zone therein) is characterized in that it is defined by a perimeter (or zone) boundary, and it includes at least one entry point, and at least one exit point. The entry and exit points may be the same, or different. An entry point includes a gatekeeper assembly, typically in the form of one of: a barcode reader, a video camera, a card reader, a biometric input device (e.g., a weighing scale, a retina scanner, a fingerprint scanner, a palm reader, a voice-print analyzer, etc.). There may be multiple such gatekeeper assemblies, and one or more of these assemblies also may be present at the exit point. Gatekeeper assemblies (or, more generally, gatekeepers) may also be located at a particular zone boundary within the restricted area. Except with respect to the specific details described below, the nature and operation of the gatekeeper assembly is outside the scope of this disclosure; it is assumed merely that the user has the ability to interact with the gatekeeper assembly and that interaction can generate data associated with that interaction.

According to a feature of this disclosure, a mobile device management platform (such as shown in FIG. 4) is provided with the ability, preferably through the gatekeeper assembly, to interact with the user's mobile device and, in particular, to enable one or more setting(s) specific to a security policy (for the restricted area or zone therein) to be applied on the device (upon entry), and then un-applied (upon exit). As will be described, the notion of applying a security setting to the device may involve one of: adding a new configuration, deleting an existing configuration, modifying a particular setting, re-instating a prior setting, or any variant. By adjusting one or more security settings on the device, the user of the device is permitted to retain possession and control over the mobile device while within the restricted area (or some zone thereof), while at the same time the enterprise (or other entity permitting such access) is assured that the mobile device can only be used within that area in a manner that is consistent with a defined security policy. The approach thus carefully balances both the security risks inherent in allowing the user to continue to possess the mobile device, while also allowing the user continued use of the device in a manner that does not impair or affect the restrictions set forth in the security policy.

Figure 5:
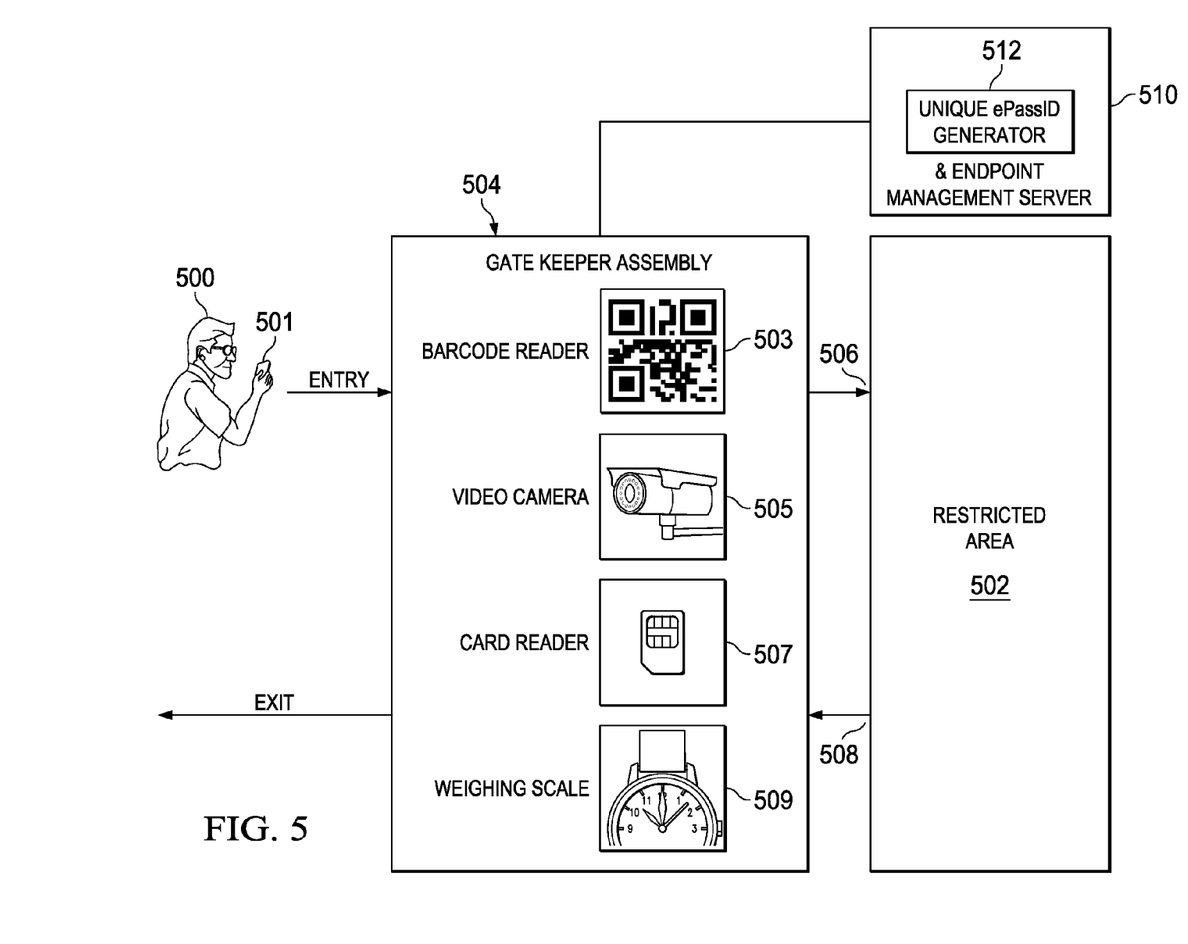
FIG. 5 illustrates an operating environment in which the techniques of this disclosure are implemented.

FIG. 5 illustrates a representative embodiment. Here, an end user 500 has a mobile device 501 and desires entry into a restricted area 502 that is accessible through the gatekeeper assembly 504. As noted above, the gatekeeper assembly 504 includes one or more devices or systems, such as a barcode reader 503, a video camera 505, a card reader 507, a weighing scale 509, or the like. The restricted area includes entry point 506, and exit point 508, which may or may not be the same. In the context of this disclosure, interaction data generated at the gatekeeper assembly 504 is provided to a mobile device management (MDM) platform 510, which includes a generator tool 512 as will be described below. A representative MDM platform was described above in connection with FIG. 4. Generalizing, the MDM provides an endpoint management service that provides and enforces security policy based on one or more factors, such as user identity, group or role, time-of-day, context, and the like. The gatekeeper assembly or assemblies 504 are fitted at the entry and exit points, as described. Although not shown in FIG. 5, the restricted area 502 may be further sub-divided into distinct (special) security zones, and a particular security zone may have its own dedicated gatekeeper(s). The restricted area 502 (and any defined security zone therein) is defined by a perimeter boundary and, as noted, the respective entry/exit points having the gatekeeper.

The user 500 desires entry into the restricted area 502 while retaining possession of the mobile device 501. The enterprise (or other management entity) desires to permit the user such access, but while ensuring that the user does not use the mobile device within the restricted area in a manner that is otherwise inconsistent with a security policy for the area (or zone therein)

Figure 6:
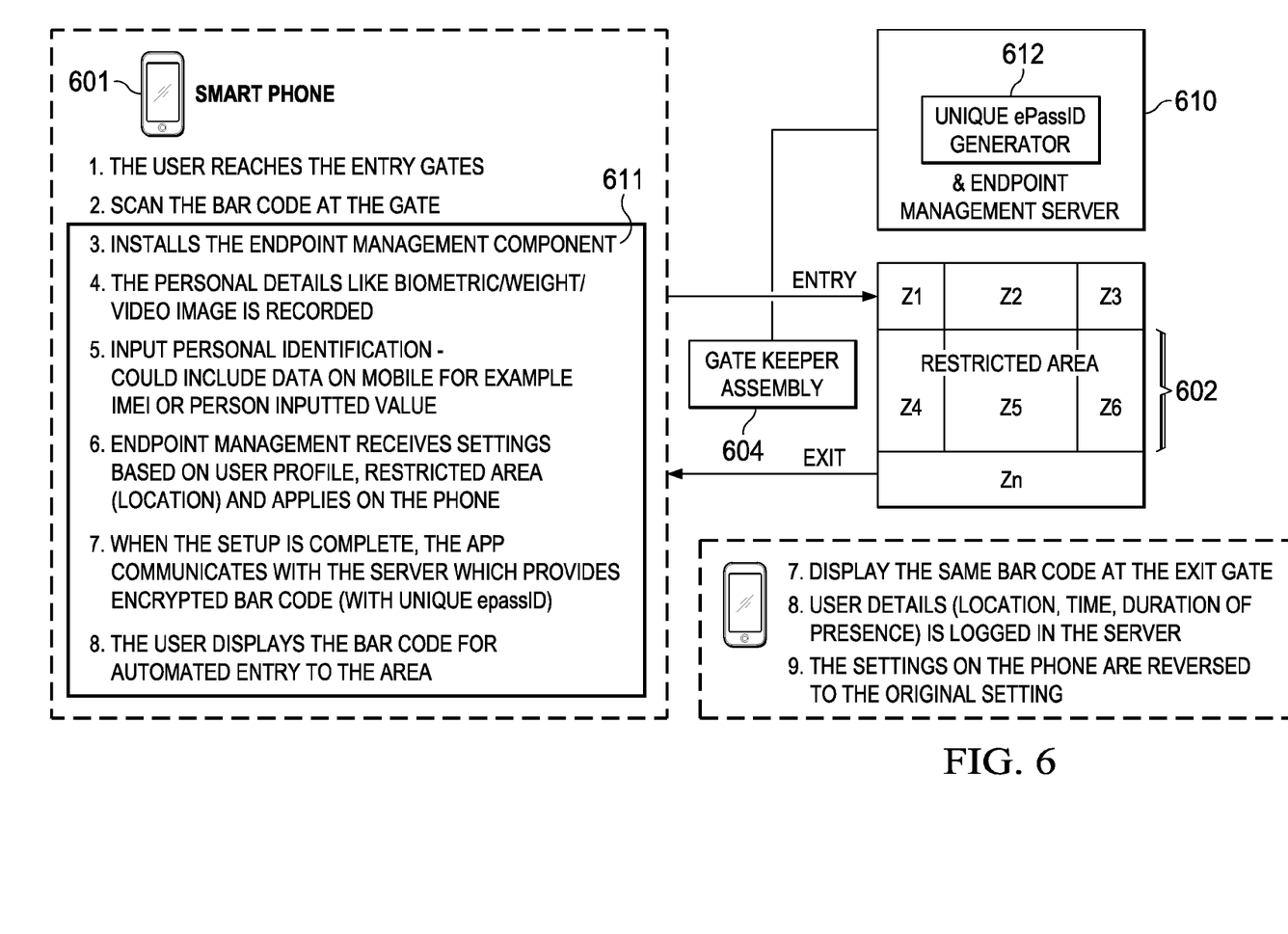
FIG. 6 depicts how the technique of this disclosure is implemented to restrict one or more capabilities of a mobile device that is carried into a restricted area according to an enterprise security policy.

FIG. 6 illustrates the basic operation of the subject matter of this disclosure. As will be described, in one embodiment, the mobile device is configured to receive an endpoint management component (or "agent"), preferably at the time when the user first interacts with the gatekeeper assembly. In general, that agent executes on the mobile device for as long as the user is within the restricted area, all the while enforcing a particular security policy that is applicable to the user and the device at the particular time, place and other context. When the user exits the restricted area, preferably enforcement of the security policy ceases (and the agent may be deleted (manually, automatically or programmatically). The particular manner by which the security policy is enforce may be varied, although typically that process involves adjusting one or more settings on the device, as will be described by way of non-limiting examples below.

At step (1), the user reaches the entry point of the restricted area 602 that has one or more sub-divided security zones Z1 . . . Zn. The user has a mobile device 601, such as shown in FIG. 3. The entry point 606, for example, may include an entry gate having the gatekeeper assembly 604. For illustration purposes, it is assumed that the user has the ability to download and display (on the device interface) a code, such as a barcode, QR code, or the like. The code is provided by the enterprise or other entity that desires to permit the user (in possession of the mobile device) access to the restricted area. At step (2), the code is scanned by the gatekeeper assembly 604 in a conventional manner. Alternatively, the code is provided to the gatekeeper wirelessly, or the like. This initial interaction between the mobile device and the gatekeeper is identified to the mobile device management platform running an endpoint management server 610, which then determines (using other known mechanisms) whether the user's access to the restricted area is permitted. In particular, this determination may involve any known user authentication and authorization techniques. In the alternative, the user may have been registered to use the system. It is assumed that the user's access to the restricted area (with the mobile device) is permitted or found to be permitted; thus, at step (3), an endpoint management agent component 611 is automatically installed on the user's mobile device. This installation may occur over whatever connectivity is then present to the device (e.g., 4G+, WiFi, Bluetooth, Femto cell, etc.). There may be one or more additional security checks implemented on the device, or between the device and the management server, before the endpoint management agent component 611 is installed on the device 601. In an alternative embodiment, the endpoint management agent component 611 is already present on the device and configured to be activated (or re-activated) when the system determines that the user is permitted access to the restricted area 602. The endpoint management agent thus may be adapted for repeated use, a one-time use, or the like.

At step (4), the endpoint management agent component 611 may interact further with the gatekeeper assembly 604 to receive and record additional typically biometric data about the user, e.g., an image of the user, one or more other physical details about the user that are sensed by the gatekeeper devices and systems, and so forth. At step (5), the endpoint management agent component 611 receives one or more settings from the device, such as IMEI, a user PIN, a biometric, or the like. These settings may constitute a "user profile" for the mobile device, and this user profile data may then be provided to the endpoint management server component 610 running in the MDM platform. At step (6), the endpoint management agent component 611 receives from the endpoint management server 610 one or more settings to be applied to the device. The particular settings also may be mobile device- or mobile device OS-specific.

Preferably, the settings provided by the management server 610 are based on the applicable security policy, which typically takes into account the nature of the restricted area, the user's identity and device profile information, the time of day, other contextual data, and combinations thereof. The endpoint management agent 611 configures the mobile device according to the settings to complete a setup process.

When the setup on the mobile device is complete, at step (7) the mobile device 601 communicates that fact to the endpoint management server 610. The endpoint management server then responds by generating and providing the mobile device with a "pass" code. Preferably, the pass code is a one-time code that evidences the user's "right" to enter the restricted area 602 in possession of the mobile device. To that end, the pass code is adapted to be read by (or otherwise received, depending on the technologies implemented) the available gatekeeper assembly device or system. This may or may not be the same code reader that was used to scan the code in step (2).

Preferably, the pass code is an encrypted bar (or QR-type) code that encodes a unique electronic pass identifier (ePassID) for the mobile device access to the restricted area. As noted above, preferably the ePassID is a one-time use code, and this code may only be valid for a given time period after its creation. In one embodiment, the ePassID is rendered on the mobile device display interface. Thus, at step (8), the user displays the pass code, which is then read by the gatekeeper bar code reader. As noted, in an alternative embodiment, the ePassID is transmitted to the reader wirelessly, or otherwise provided from the mobile device to the gatekeeper. The gatekeeper assembly then checks back with the MDM platform 610 (or some other security system) to verify the pass code. If the pass code is verified, automated entry to the restricted area is permitted.

The user then accesses the restricted area with the mobile device in hand.

It is assumed that the user, having accessed the restricted area, now leaves the area. At step (9), the pass code is once again displayed (or otherwise made available) to the applicable reader device at the exit point. At step (10), user details (e.g., location, time, duration or presence within the area, etc.) are logged in the endpoint management server. At step (11), the endpoint management agent component 611 receives control information to reverse (un-do) the settings that were applied on the mobile device at step (6). In other words, when the user exits the restricted area, preferably the settings are restored to the settings that existed on the device when the user first approached.

There are numerous variants that may be applied, preferably as enforced by the mobile device management server and its interaction(s) with the agent component on the mobile device. For example, as the user roams within the restricted area, the system can provide continuous or periodic authentication by checking and validating with the security policy the user's movements, actions, or other interactions with people, devices or systems within the restricted area. One or more other users may be present within the restricted area having similar controls in place, and end user management agents (on the devices) may interact with one another. The authentication may be based on the location, user, mobile and physical attributes that are captured, and the like. If the outcome of this evaluation raises a security concern (e.g., by triggering an applicable policy expression or rule as defined in the applicable security policy), the management server (or some gatekeeper or other device within the restricted area) may be controlled to provide the agent component with additional control information to further modify (edit, adjust or the like) one or more settings on the mobile device. For example, the device security settings may be modified to implement a "higher risk" security policy that disables access to all key features of the mobile device, triggers an alarm, or the like. As a concrete example, assume that the restricted area includes an internal gate at a sub-zone. When going through a second gate, if the user's "weight" as captured by the scale at a first gate differs (by some configurable degree) from that captured at a second gate, this may be an indication that the user has handed off his or her device to another person, in which case one or more key device features (e.g., camera, WiFi access, etc.) are then automatically disabled by the agent component. This is just a representative example scenario, however, as there may be many variations depending on the security policy, the nature of the restricted area and user's activity within therein, the types of gatekeepers implemented, and so forth.

More generally, the mobile device agent interacts with the gatekeeper assembly and perhaps other managed devices in the restricted area to provide continuous monitoring, authentication and authorization of the mobile device.

According to another variant, the mobile device endpoint configuration agent may be configured to send a heartbeat to the MDM platform or some other security system to identify user movements and positions within the restricted area, and this data can be combined with data from regularly-spaced scanners to match the device to the person carrying the device. This heartbeat signal also enables the access control or other systems associated with the restricted area to narrow down (as necessary) the user's location. The system also may use the mobile device GPS or other positioning sensors to confirm the device (and thus the user's location) and coordinates within the restricted area.

The mobile device with the agent component installed may act as a user ID mechanism (e.g., a user badge) to control entry of the user into the restricted area, as well as the one or more security zones within the restricted area. In this embodiment, a set of user credentials may be installed on the mobile device for presentation to others within the restricted area. The user credentials may be used to enforce additional security constraints, e.g., to permit the user to use the user credential to open a lock in a controlled facility, or the like.

Each zone within the restricted area may have its own specific policy. A security policy may have one or more distinct instances (each with different permissions or constraints) based on a role of the user, a particular location within the area (or zone), some other context, or combinations thereof.

Preferably, the management agent includes a control routine that automatically increases the security settings on the mobile device by some configurable degree (or as specified in the applicable security policy) if the user attempts to tamper with the management agent (or to override the existing security settings) in any way while the user is located within or adjacent the restricted area being protected by the techniques of this disclosure.

If the user prefers not to install the device management software, or if the user does not carry a compatible smartphone, a device may be loaned to the user with the agent software preloaded. In this case, scanning the QR code can invoke registration of the user with the device but would not necessarily trigger installation (or later uninstallation) of the management agent software.

While the management agent is enforcing the security policy on the mobile device, the device's configuration (typically, one or more security settings) are enabled in such a manner so as to inhibit one or more operations of the mobile device. The nature of the security setting(s) and the resulting device restrictions will depend on the security policy. Thus, security policies might be simple or more complex, such as: "Disable camera," Disable WiFi," "Disable video camera," "Disable outbound e-mail," "Disable text notepad," "Disable camera and outbound connectivity for the next 30 minutes and track the user's location," etc.

As noted, preferably the management agent component is controlled to re-set the applied security settings upon the user's exit from the restricted area (or the security zone therein). The re-set may be controlled to take place a given time period after the user exits, or perhaps at a given distance away from the restricted area, or some combination of time and distance.

The techniques herein may work with or interoperate with other access control methods and systems including, without limitation, role-based access control systems (RBACs).

The following provides several example use cases, which are merely exemplary. The technique may be used to restrict or control the features enabled on the mobile device of an employee working in a BPO (Business Process Outsourcing) unit especially handling client confidential information. The approach may be used to restrict use of a mobile device camera or other data transfers through the device at places hosting important infrastructure (e.g., labs, military bases, airport customs areas, etc.). The approach may be used to disable features of the mobile device for a specific time period at a specific location (e.g., Executives attending a confidential Board meeting at a Conference Center at 10-11 am). In the healthcare industry, the approach may be used to prevent data leakage of patient information from a hospital WiFi network. The technique may be used inside ropeways or special vehicles plying in a restricted zone where using device features may cause a health hazard. Another example scenario involves continuous authentication in association with one or more gatekeeper assemblies to enforce different policies for different zones in a workplace; in this way, an employee may be restricted from using his or her phone at a workstation while use of the phone in a common area would be unrestricted.

This technique of this disclosure provides significant advantages. The technique enables implementation of an enterprise or government security policy involving physical security constraints—e.g., that a visiting user not take pictures when inside the restricted area, to alert the enterprise when that policy is violated, etc.—by leveraging mobile device capabilities and security technologies. The system advantageously automates enforcement of security policies on mobile devices automatically for entry and exit into restricted areas. The system preferably leverages existing gatekeeper tools, technologies (video, weighing scale, biometric readers, badge readers, etc.) to manage the process in seamless, non-intrusive fashion.

As has been described, the system and method provide for the ability to control features of mobile devices based on one or more factors, such as the role of the user, the current location of the user, the enterprise security policy, and combinations thereof. As noted, preferably the technique provides for automatic restoration of the original state of the device when the user leaves the restricted area. The technique further provides for the ability to enforce different policies and feature controls on the mobile device based on the current zone within the restricted area where the user (device) is located.

There is no restriction on the type of security policy that may be implemented. There is no restriction on the particular type of security setting(s) that may be adjusted by the management agent. The management agent functions may be executed in a web browser, or in a mobile app executing on the mobile device. As described, preferably the mobile device receives and installs the agent component automatically, and that component enables the user of the mobile device to access the restricted agent but under the control of the "server-side" running on the mobile device management system.

A particular security policy may tailor security settings on the mobile device to a particular risk profile of the individual device, where the risk profile is fine-grained and based on the types of applications installed on the device, the services they are accessing, and the operation(s) the user granted the device authorization to perform. Thus, the approach also may take into account the actual mobile application(s) installed on the device (and those actively in use), the service(s) (typically one or more back-end applications supported in or in association with the enterprise) those mobile applications are accessing, and the scope of operations the user has granted the device authorization to perform. By combining this information to create the risk profile, a suitable security policy, including one that does not unnecessarily degrade device usability, may then be applied.

The agent component may be a standalone module that is downloaded and installed in the mobile device, or it may be native to the device.

In a particular embodiment, the mobile device management platform as described comprises hardware, operating system and software resources that are necessary to implement the trusted storage and policy enforcement layers as described herein. For enhanced security, the various components may include appropriate cryptographic routines to generate cryptographic hashes, to store and manage session keys, to interact with external trusted routines and devices, to encrypt and decrypt data, to generate digital signatures, and the like.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, JSON, REST, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. The policy management system or components thereof may be hosted in the cloud.

Still more generally, the subject matter described herein can take the form of an entirely hardware embodiment, an entirely software embodiment or an embodiment containing both hardware and software elements. In a preferred embodiment, the security policy enforcement agent is implemented in software, which includes but is not limited to firmware, resident software, microcode, and the like. Furthermore, the device-specific policy enforcement functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the device-specific and enterprise-specific components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

Further, the mobile device and policy management functionality provided herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a "client-side" application should be broadly construed to refer to an application, a page associated with that application, or some other resource or function invoked by a client-side request to the application. Further, while typically the client-server interactions occur using HTTP, this is not a limitation either. The client server interaction may be formatted to conform to the Simple Object Access Protocol (SOAP) or JavaScript Object Notation (JSON) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

The nature of the "restricted area" is not intended to be limited. The term may refer to any controlled facility, location, environment, containment system, or the like, to which a user possessing a mobile device desires access.

The techniques herein provide for improvements to another technology or technical field, namely, access control systems, as well as improvements to mobile devices themselves.

The invention claimed is:

1. A method to enforce a security policy in association with access by a user to a restricted area, comprising:
responsive to grant of an authorization associated with a user's permitted access to the restricted area, activating a management agent on a mobile device by receiving an access code, executing a request and response interaction with a gatekeeper by which the access code is provided to the gatekeeper, receiving a pass code upon a verification of the access code, and receiving and installing the management agent on the mobile device, the management agent being activated without requiring direct user input to the mobile device to activate the management agent and wherein the pass code encodes information identifying one or more control settings;
responsive to activation of the management agent on the mobile device, automatically instantiating, via the management agent, the one or more control settings on the mobile device according to an instance of the security policy that is based at least in part on a risk profile of the mobile device, the risk profile of the mobile device being based on an application installed on the mobile device and currently active; and
controlling, by the management agent, the mobile device according to the one or more control settings to enforce the security policy while the user is located within the restricted area.

2. The method as described in claim 1 wherein the one or more control settings enforce a restriction on a capability of the mobile device without impairing a given operating function while the mobile device is within the restricted area.

3. The method as described in claim 2 further including:
reversing, by the management agent, the one or more control settings on the mobile device upon a determination that the mobile device is no longer within the restricted area.

4. The method as described in claim 1 wherein the restricted area includes at least first and second security zones, the management agent controlling the mobile device to enforce a distinct instance of the security policy depending on a location of the mobile device within one of the first and second security zones.

5. The method as described in claim 1 wherein the management agent applies the instance of the security policy also based on one of: a role of the user, a service that is being accessed by the application, and an operational scope the user has granted the mobile device authorization to perform.

6. The method as described in claim 1 further including:
supplying a credential to the mobile device for use within the restricted area; and
enforcing an access control within the restricted area using the supplied credential.

7. The method as described in claim 1 wherein the management agent is further operative to track and report on a location of the user within the restricted area.

8. Apparatus associated with a mobile device, comprising:
a processor;
computer memory holding computer program instructions executed by the processor to enforce a security policy in association with access by a user to a restricted area by:
responsive to grant of an authorization associated with a user's permitted access to the restricted area, activating a management agent on the mobile device by receiving an access code, executing a request and response interaction with a gatekeeper by which the access code is provided to the gatekeeper, receiving a pass code upon a verification of the access code, and receiving and installing the management agent on the mobile device, the management agent being activated without requiring direct user input to the mobile device to activate the management agent and wherein the pass code encodes information identifying one or more control settings;
responsive to activation of the management agent on the mobile device, automatically instantiating, via the management agent, one or more control settings on the mobile device according to an instance of the security policy that is based at least in part on a risk profile of the mobile device, the risk profile of the mobile device being based on an application installed on the mobile device and currently active; and
controlling, by the management agent, the mobile device according to the one or more control settings to enforce the security policy while the user is located within the restricted area.

9. The apparatus as described in claim 8 wherein the one or more control settings enforce a restriction on a capability of the mobile device without impairing a given operating function while the mobile device is within the restricted area.

10. The apparatus as described in claim 9 wherein the computer program instructions are further executed by the processor to:
reverse, by the management agent, the one or more control settings on the mobile device upon a determination that the mobile device is no longer within the restricted area.

11. The apparatus as described in claim 8 wherein the restricted area includes at least first and second security zones, the management agent controlling the mobile device to enforce a distinct instance of the security policy depending on a location of the mobile device within one of the first and second security zones.

12. The apparatus as described in claim 8 wherein the management agent applies the instance of the security policy also based on one of: a role of the user, a service that is being accessed by the application, and an operational scope the user has granted the mobile device authorization to perform.

13. The apparatus as described in claim 8 wherein the computer program instructions are further executed by the processor to:
supply a credential to the mobile device for use within the restricted area; and
enforce an access control within the restricted area using the supplied credential.

14. The apparatus as described in claim 8 wherein the management agent is further operative to track and report on a location of the user within the restricted area.

15. A computer program product in a non-transitory computer readable storage medium for use in data processing system, the computer program product holding computer program instructions which, when executed by the data processing system, perform a method to enforce a security policy in association with access by a user to a restricted area, the method comprising:
responsive to grant of an authorization associated with a user's permitted access to the restricted area, activating a management agent on a mobile device by receiving an access code, executing a request and response interaction with a gatekeeper by which the access code is provided to the gatekeeper, receiving a pass code upon a verification of the access code, and receiving and installing the management agent on the mobile device, the management agent being activated without requiring direct user input to the mobile device to activate the management agent and wherein the pass code encodes information identifying one or more control settings;
responsive to activation of the management agent on the mobile device, automatically instantiating, via the management agent, one or more control settings on the mobile device according to an instance of the security policy that is based at least in part on a risk profile of the mobile device, the risk profile of the mobile device being based on an application installed on the mobile device and currently active;
controlling, by the management agent, the mobile device according to the one or more control settings to enforce the security policy while the user is located within the restricted area.

16. The computer program product as described in claim 15 wherein the one or more control settings enforce a restriction on a capability of the mobile device without impairing a given operating function while the mobile device is within the restricted area.

17. The computer program product as described in claim 16 wherein the method further includes:
reversing, by the management agent, the one or more control settings on the mobile device upon a determination that the mobile device is no longer within the restricted area.

18. The computer program product as described in claim 15 wherein the restricted area includes at least first and second security zones, the management agent controlling the mobile device to enforce a distinct instance of the security policy depending on a location of the mobile device within one of the first and second security zones.

19. The computer program product as described in claim 15 wherein the management agent applies the instance of the security policy also based on one of: a role of the user, a service that is being accessed by the application, and an operational scope the user has granted the mobile device authorization to perform.

20. The computer program product as described in claim 15 wherein the method further includes:
supplying a credential to the mobile device for use within the restricted area; and
enforcing an access control within the restricted area using the supplied credential.

21. The computer program product as described in claim 15 wherein the management agent is further operative to track and report on a location of the user within the restricted area.

\* \* \* \* \*